US005708571A

United States Patent [19]
Shinada

[11] Patent Number: 5,708,571
[45] Date of Patent: Jan. 13, 1998

[54] SYNCHRONOUS RECTIFYING CIRCUIT OF AN ACTIVE CLAMPING TYPE WITH LESS DRIVING LOSS AND LESS CONTINUITY LOSS

[75] Inventor: Yosuke Shinada, Tokyo, Japan

[73] Assignee: NEC Corporation, Tokyo, Japan

[21] Appl. No.: 712,833

[22] Filed: Sep. 12, 1996

[30] Foreign Application Priority Data

Sep. 13, 1995 [JP] Japan ................................ 7-235037

[51] Int. Cl.⁶ ................................................. H02M 1/12
[52] U.S. Cl. ............................................................. 363/16
[58] Field of Search ................................ 363/16, 17, 18, 363/20, 21, 24, 25, 26, 34, 37, 133, 134; 323/207, 208

[56] References Cited

U.S. PATENT DOCUMENTS 5,224,025 6/1993 Divan et al. ............................ 363/16

FOREIGN PATENT DOCUMENTS 5-316725 11/1993 Japan .

Primary Examiner—Aditya Krishnan
Attorney, Agent, or Firm—Sughrue, Mion, Zinn, Macpeak & Seas, PLLC

[57] ABSTRACT

In a synchronous rectifying circuit comprising a main transformer, a primary circuit, a secondary circuit, and a control circuit, the secondary circuit includes a synchronous rectifier which comprises not only a second series circuit comprising first and second synchronous rectifying elements but also first and second impedance circuits. The first impedance circuit is inserted between an end of a secondary winding of the main transformer and a first control terminal of the first synchronous rectifying element. The second impedance circuit is inserted between another end of the secondary winding of the main transformer and a second control terminal of the second synchronous rectifying element. Each of the first and the second impedance circuits may consist of a parallel circuit comprising a resistor and a diode. Each of the first and the second impedance circuits may a capacitor. Each of the first and the second impedance circuits may consist of a capacitor and a parallel circuit comprising a resistor and a diode.

20 Claims, 9 Drawing Sheets

SYNCHRONOUS RECTIFYING CIRCUIT OF AN ACTIVE CLAMPING TYPE WITH LESS DRIVING LOSS AND LESS CONTINUITY LOSS

BACKGROUND OF THE INVENTION

This invention relates to a synchronous rectifying circuit such as a switching regulator for use in a field where a relatively high efficiency is required in a power supply and, more particularly, to a synchronous rectifying circuit of an active clamping type for clamping a reset voltage appearing at a primary winding of a main transformer to carry out rectification of a secondary winding voltage appearing at a secondary winding of the main transformer by using synchronous rectifier elements.

In general, switching power sources are used as devices for obtaining an output d.c. voltage at a high efficiency. Various switching power sources of the type are already known. By way of example, a switching power source is disclosed in U.S. Pat. No. 5,224,025 issued to Deepakraj M. Divan et al. entitled "Forward Converter with Two Active Switches and Unity Power Factor Capability". The switching power source according to Divan et al comprises a main transformer having primary and secondary windings for forming parts of primary and secondary circuits. The primary circuit comprises main and subsidiary switching devices each of which may be a metal oxide semiconductor (MOS) field effect transistor (FET). The secondary circuit comprises a rectifier and a smoothing circuit. The rectifier comprises first and second rectifying elements. The smoothing circuit comprises an inductor (choking coil) and an output capacitor. The first rectifying element is connected to the secondary winding of the main transformer in series. The second rectifying element is connected to the the first rectifying element an the secondary winding. The inductor is connected to a point of connection between the first and the second rectifying elements. The output capacitor is connected between output terminals and connected to the inductor in series. The output capacitor is connected to in parallel to a load resistor. In the switching power source according to Divan et al, a diode is used as each of the first and the second rectifying elements. Inasmuch as the diode is used as each of the rectifying elements of the secondary circuit, the switching power source according to Divan et al, has limitations of reduction of a forward voltage or reduction of continuity loss and therefore loss of this portion is at stake.

In order to reduce loss in the rectifier, another switching power source is proposed in Japanese Unexamined Patent Prepublication of Kokai No. Hei 5-316,725 (316,725/1993) for Japanese Patent Application No. 115,764 of 1992. The switching power source according to Kokai No. Hei 5-316,725 also comprises a main transformer having primary and secondary windings for forming parts of primary and secondary circuits. The primary circuit comprises a main switch. The secondary circuit comprises a rectifier and a smoothing circuit. The rectifier comprises first and second diodes and first and second FETs. The first FET is connected in parallel to the first diode while the second FET is connected in parallel to the second diode. A control circuit controls turning on and off of the main switch and the first and the second FETs. Inasmuch as the FET is used as the rectifying element in the rectifier, it is possible to reduce loss in the rectifier.

In addition, in the rectifier using semiconductor elements each serving as a switch or a rectifying element, a surge voltage occurs on switching. In a conventional rectifier, the surge voltage is reduced by using a RC snubber or the like.

In order to restrain the surge voltage, still another switching power source is known which is called a synchronous rectifier circuit of an active clamping type. The synchronous rectifier circuit of the active clamping type comprises a main transformer, a primary circuit, a secondary circuit, and a control circuit. The main transformer has a primary winding connected to the primary circuit and a secondary winding connected to the secondary circuit. The primary circuit comprises a main switching device, a subsidiary switching device, and an input capacitor. The main switching device is connected to the primary winding in series. A series circuit composed of the subsidiary switching device and the input capacitor is connected in parallel to the primary winding. Each of the main and the subsidiary switching devices may be composed of a MOSFET. Turning on/off of the main and the subsidiary switching devices is controlled by the control circuit. The main and the subsidiary switching devices are alternately put into on-state. The subsidiary switching device in cooperation with the input capacitor clamps a primary reset voltage appearing at the primary winding of the main transformer. The subsidiary switching device is therefore called a clamping switching device.

The secondary circuit comprises a synchronous rectifier and a smoothing circuit. The synchronous rectifier comprises first and second synchronous rectifying elements. The first synchronous rectifying element has a first control terminal which is directly connected to an end of the secondary winding. The second synchronous rectifying element has a second control terminal which is directly connected to another end the secondary winding. The first and the second synchronous rectifying elements are operable in synchronism with the main switching device. Each of the first and the second synchronous rectifying elements may be composed of a MOSFET which has a gate electrode as the control terminal. Inasmuch as the primary reset voltage is clamped, it is possible to restrain the surge voltage without loss. In addition, by clamping the primary reset voltage, it is possible to use, as the main switching device and the first synchronous rectifying element, a semiconductor element having a low voltage-resistant or a low continuity loss part.

In the rectifier using the MOSFETs, it is desirable that the gate electrode of each MOSFET is supplied with a driving signal having a rectangular waveform. It is assumed that the MOSFET is used as the rectifying element and the gate electrode of the MOSFET is driven by the driving signal of the secondary winding voltage appearing at the secondary winding of the main transformer. When the driving signal has a voltage waveform other than the rectangular waveform, it is possible to make the driving signal have the rectangular waveform by adopting the rectifier circuit of the active clamping type. Consequently, is is possible to enhance effect of a synchronous rectifying system by applying the active clamping type to circuitry for the synchronous rectifying system.

However, there are some cases where loss of the synchronous rectifier is larger. This is because there are some cases where the control terminals of the synchronous rectifying elements cannot be applied with the optimum driving voltage. In addition, the conventional synchronous rectifying circuit must use, as the synchronous rectifying elements, high voltage-resistant elements. This is because a ringing voltage having a large value generates the control terminals and common terminals of the synchronous rectifying elements caused by resonance due to parasitic capacitance of the synchronous rectifying elements, leakage inductance of the main transformer, parasitic inductance of current lines, and so on. Furthermore, there are some cases where driving loss in the synchronous rectifier becomes large. This is because the secondary winding voltage appearing at the secondary winding of the main transformer is too larger to drive the control terminals of the synchronous rectifying elements especially when the input d.c. voltage is high to obtain a high output d.c. voltage.

SUMMARY OF THE INVENTION

It is therefore an object of this invention to provide a synchronous rectifying circuit which is capable of reducing loss in a synchronous rectifier.

It is another object of this invention to provide a synchronous rectifying circuit of the type described, which is capable of decreasing driving loss and continuity loss in the synchronous rectifying circuit Other objects of this invention will become clear as the description proceeds.

On describing the gist of an aspect of this invention, it is possible to understand that a synchronous rectifying circuit of an active clamping type converts an input d.c. voltage into an output d.c. voltage. The synchronous rectifying circuit has a pair of input terminals supplied with the input d.c. voltage and a pair of output terminals for outputting the output d.c. voltage. The synchronous rectifying circuit comprises a main transformer having a primary winding and a secondary winding, a primary circuit connected to the input terminals and the primary winding of the main transformer, a secondary circuit connected to the secondary winding of the main transformer and the output terminals, and a control circuit connected to a preselected one of the output terminals for controlling the primary circuit to produce main and subsidiary control pulse signals.

According to this invention, in the above-understood synchronous rectifying circuit, the primary circuit comprises a main switching device connected in series to the primary winding of the main transformer to form a primary series connection circuit and operable in response to the main switch control pulse signal to be selectively put into an on-state and an off-state. The primary series connection circuit is connected between the input terminals. Connected in parallel to the primary winding of the main transformer, a first series circuit comprises a clamping capacitor and a subsidiary switching device which is operable in response to the subsidiary control pulse signal to be selectively put into an on-state and an off-state. The subsidiary switching devices carries out reverse operation with the main switching device to clamp a primary reset voltage appearing at the primary winding of the main transformer. The secondary circuit includes a synchronous rectifier connected to parallel to the secondary winding of the main transformer. The secondary circuit comprises a second series circuit connected in parallel to the secondary winding of the main transformer. The second series circuit comprises first and second synchronous rectifying elements which are operable in synchronism with the main switching device. The first and the second synchronous rectifying elements have first and second control terminals, respectively. The first and the second synchronous rectifying elements are joined together at a node. A first impedance circuit is inserted between an end of the secondary winding of the main transformer and the first control terminal of the first synchronous rectifying element. A second impedance circuit is inserted between another end of the secondary winding of the main transformer and the second control terminal of the second synchronous rectifying element.

In the above-understood synchronous rectifying circuit, the first series circuit may be connected to parallel to the main switching device in place of the primary winding of the main transformer.

DESRIPTION OF THE PREFERRED EMBODIMENTS

Figure 1:
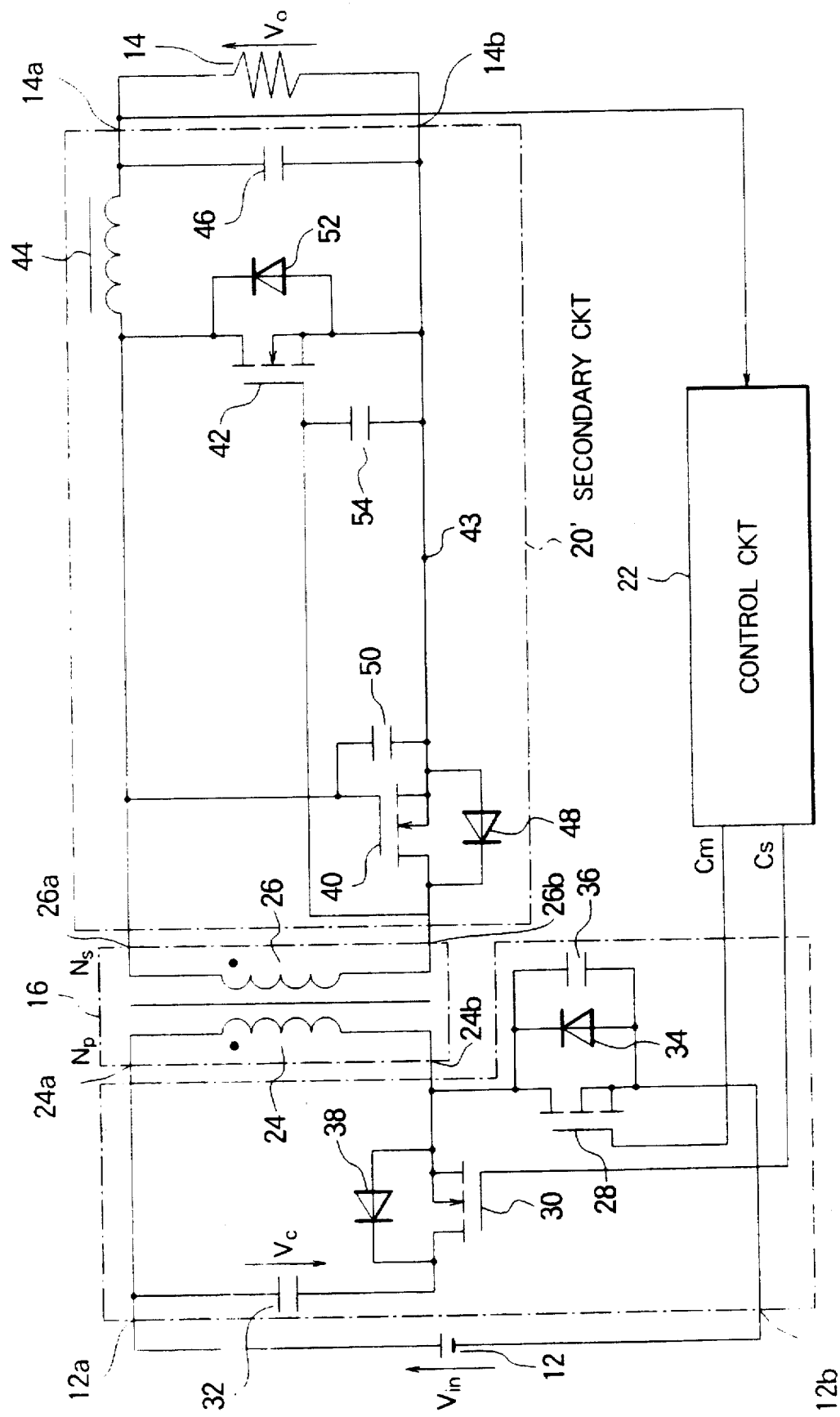
FIG. 1 is a block diagram of a conventional synchronous rectifying circuit of an active clamping type.

Referring to FIG. 1, a conventional synchronous rectifying circuit will be described in order to facilitate an understanding of this invention. The illustrated synchronous rectifying circuit is installed between an input power source 12 and a load resistor 14. The synchronous rectifying circuit has positive and negative input terminals 12a and 12b and positive and negative output terminals 14a and 14b. The input power source 12 supplies the positive and the negative input terminals 12a and 12b with an input d.c. voltage $V_{in}$. The input power source 12 has a positive electrode connected to the positive input terminal 12a and a negative electrode connected to the negative input terminal 12b. The load resistor 14 is connected between the positive and the negative output terminals 14a and 14b between which an output d.c. voltage $V_o$ appears. At any rate, the synchronous rectifying circuit converts the input d.c. voltage $V_{in}$ into the output d.c. voltage $V_O$.

The synchronous rectifying circuit comprises a main transformer 16, a primary circuit 18, a secondary circuit 20', and a control circuit 22. The main transformer 16 has a primary winding 24 connected to the primary circuit 18 and a secondary winding 26 connected to the secondary circuit 20'. The primary winding 24 has a winding starting end 24a and a winding ending end 24b. The secondary winding 26 has a winding starting end 26a and a winding ending end 26b.

The primary circuit 18 is connected between the positive and the negative input terminals 12a and 12b and the winding starting end 24a and the winding ending end 24b of the primary winding 24. The primary circuit 18 comprises a main switching device 28, a subsidiary switching device 30, and a clamping capacitor 32. Each of the main and the subsidiary switching devices 28 and 30 is composed of a metal oxide semiconductor (MOS) field effect transistor (FER) which has gate, source, and drain electrodes.

More particularly, the positive input terminal 12a is connected to the winding starting end 24a of the primary winding 24 of the main transformer 16. The winding ending end 24b of the primary winding 24 of the main transformer 16 is connected to the drain electrode of the main switching device 28. The source electrode of the main switching device 28 is connected to the negative input terminal 12a. The gate electrode of the main switching device 28 is supplied with a main switch control pulse signal Cm from the control circuit 22 in a manner to be described later. The main switching device 28 is connected in series to the primary winding 24 of the main transformer 16 to form a primary series connection circuit which is connected between the positive and the negative terminals 12a and 12b. The source electrode of the subsidiary switching device 30 is connected to the winding ending end 24b of the winding 24 of the main transformer 16. The drain electrode of the subsidiary switching device 30 is connected to an end of the clamping capacitor 32 which has another end of the winding starting end 24a of the primary winding 24 of the main transformer 16. The gate electrode of the subsidiary switching device 30 is supplied with a subsidiary switch control pulse signal Cs from the control circuit 22 in a manner to be described later. A combination of the clamping capacitor 32 and the subsidiary switching device 30 comprises a first series circuit which is connected in parallel to the primary winding 24 of the main transformer 16.

The main switching device 28 has a main switch parasitic diode 34 whose anode and cathode electrodes are connected to the source and the drain electrodes of the main switching device 28, respectively. A main switch parasitic capacitor 36 is connected between the source and the drain electrodes of the main switching device 28. The subsidiary switching device 30 has a subsidiary switch parasitic diode 38 whose anode and cathode electrodes are connected to the source and the drain electrodes of the subsidiary switching device 30.

The secondary circuit 20' is connected to the positive and the negative output terminals 14a and 14b and the winding starting end 26a and the winding ending end 26b of the secondary winding 26. The secondary circuit 20' comprises first and second MOSFETs 40 and 42, a choking coil 44, and an output capacitor 46. Each of the first and the second MOSFETs 40 and 42 has gate, source, and drain electrodes.

The first MOSFET 40 acts as a first synchronous rectifying element. Likewise, the second MOSFET 42 serves as a second synchronous rectifying element. Each of the first and the second synchronous rectifying elements 40 and 42 has a control terminal as the gate electrode and common terminals as the source and the drain electrode.

More particularly, the winding ending end 26a of the secondary winding 26 of the main transformer 16 is connected to the drain electrode of the first MOSFET 40. The winding starting end 26b of the secondary winding 26 of the main transformer 16 is connected to the drain electrode of the second MOSFET 42. The source electrodes of the first and the second MOSFETs 40 and 42 are connected to one another. That is, the first and the second MOSFETs 40 and 42 are joined together at a node which is connected to the negative output terminal 14b. The gate electrode of the first MOSFET 40 is directly connected to the winding starting end 26a of the secondary winding 26 of the main transformer 16. The gate electrode of the second MOSFET 42 is directly connected to the winding ending end 26b of the secondary winding 26 of the main transformer 16. The first and the second MOSFETs 40 and 42 comprise a second series circuit which is connected in parallel to the secondary winding 26 of the main transformer 16 and which acts as a synchronous rectifier. The choking coil 44 has an end connected to the drain electrode of the second MOSFET 42 and another end connected to an end of the output capacitor 46. The output capacitor 46 has another end connected to the source electrodes of the first and the second MOSFETs 40 and 42. Both ends of the output capacitor 46 are connected to the positive and the negative output terminals 14a and 14b. A combination of the clamping coil 44 and the output capacitor 46 serves as a smoothing circuit which is connected between the synchronous rectifier and the output terminals 14a and 14b.

The first MOSFET 40 has a first FET parasitic diode 48 whose anode and cathode electrodes are connected to the source and the drain electrodes of the first MOSFET 40, respectively. A first FET parasitic capacitor 50 is connected between the gate and the source electrodes of the first MOSFET 40. The second MOSFET 42 has a second FET parasitic diode 52 whose anode and cathode electrodes are connected to the source and the drain electrodes of the second MOSFET 42. A second FET parasitic capacitor 54 is connected between the gate and the source electrodes of the second MOSFET 42. In this specification, a combination of the main transformer 16, the primary circuit 18, and the secondary circuit 20' is called a converter.

The output d.c. voltage $V_o$ appearing at the positive output terminal 14a is supplied to the control circuit 22. Responsive to the output d.c. voltage $V_o$, the control circuit 22 produces the main and the subsidiary control pulse signals Cm and Cs which are supplied to the gate electrodes of the main and the subsidiary switching devices 28 and 30, respectively.

When the main switching device 28 is put into an off-state, voltage appear at the primary and the secondary windings 24 and 26 that are called primary and secondary reset voltages, respectively.

Referring to FIGS. 2A through 2F, description will be made about operation of the conventional synchronous rectifying circuit illustrated in FIG. 1. It is assumed that turns of the primary and the secondary windings 24 and 26 of the main transformer 16 are represented by $N_p$ and $N_r$, respectively, and that a capacitor voltage across the clamping capacitor 32 is represented by $V_c$.

Figure 2:
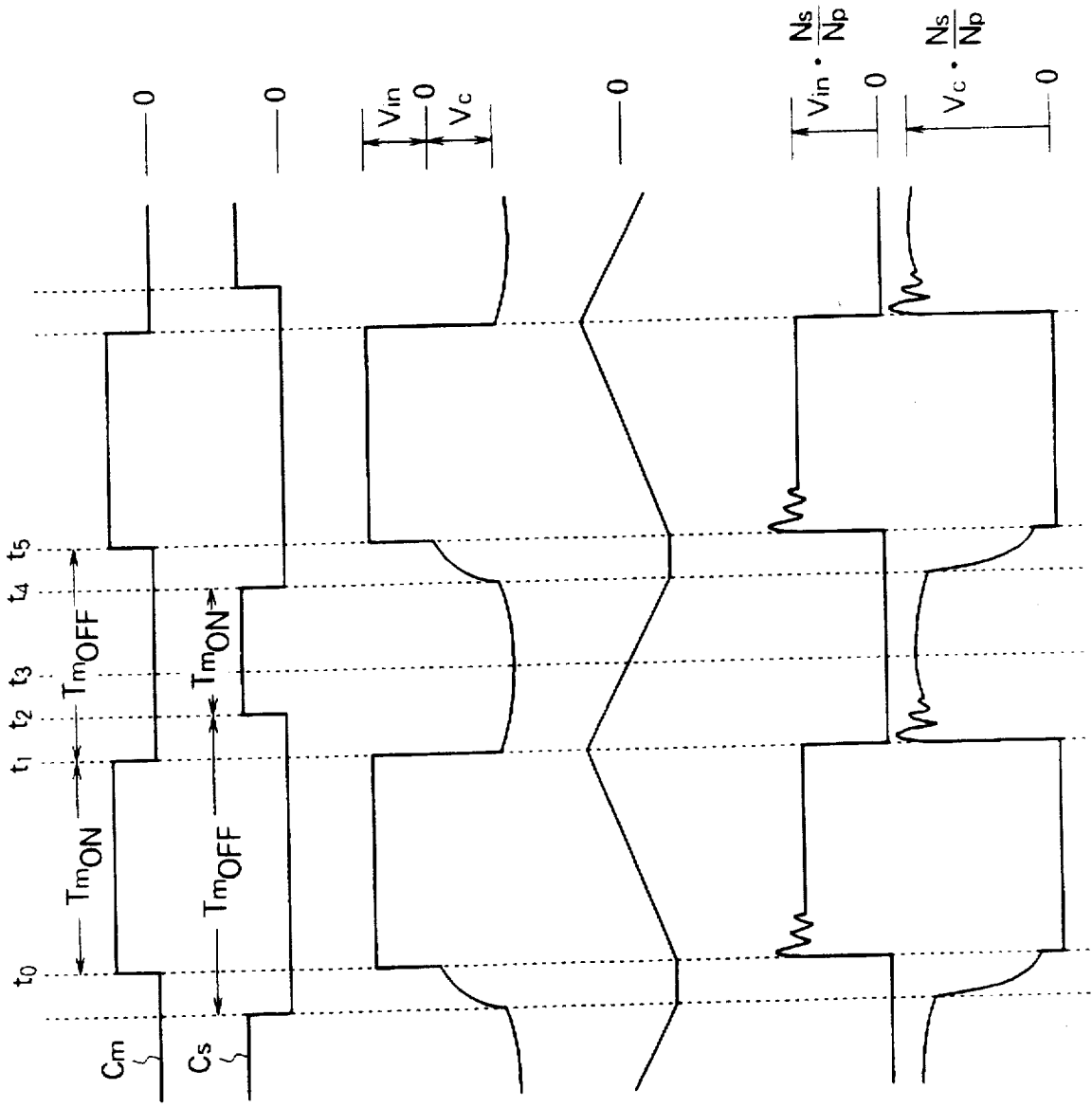
FIGS. 2A through 2F are time charts for use in describing operation of the conventional synchronous rectifying circuit of the active clamping type illustrated in FIG. 1.

FIG. 2A shows a waveform of the main switch control pulse signal Cm and FIG. 2B shows a waveform of the subsidiary switch control pulse signal Cs. FIG. 2C shows a voltage waveform of a primary winding voltage appearing at the primary winding 24 of the main transformer 16 and FIG. 2D shows an excitation current flowing through the primary winding 24 of the main transformer 16. In addition, FIG. 2E shows a voltage waveform of a first driving voltage appearing at the gate electrode of the first MOSFET 40 and FIG. 2F shows a voltage waveform of a second driving voltage appearing at the gate electrode of the second MOSFET 42.

As shown in FIGS. 2A and FIG. 2B, both of the main and the subsidiary switch control pulse signals Cm and Cs have the same switching period but the main and the subsidiary switch control pulse signals Cm and Cs have main and subsidiary on-state time intervals $Tm_{ON}$ and $Ts_{ON}$, respectively, which are shifted from one another without they overlapped. In other words, the main switch control pulse signal Cm has a main off-state time interval $Tm_{OFF}$ including the subsidiary on-state time interval $Ts_{ON}$ while the subsidiary switch control pulse signal Cs has a subsidiary off-time intervals $Ts_{OFF}$ including the main on-state time intervals $TM_{ON}$. The main and the subsidiary off-state time interval $Tm_{OFF}$ and $Ts_{OFF}$ are overlapped with one another.

The main switching device 28 is turned on at a zeroth time instant $t_0$ and is turned off at a first time instant $t_1$. The subsidiary switching device 30 is turned on at a second time instant $t_2$. At a third time instant $t_3$, the primary reset voltage of the main transformer 16 has the maximum. The subsidiary switching device 30 is turned off at a fourth time instant $t_4$. The main switching device 28 is turned on at a fifth time instant $t_5$ again. The main switching device 28 is put into the on-state for the main on-state time interval $Tm_{ON}$ between the zeroth and the first time instants $t_0$ to $t_1$ while the subsidiary switching device 30 is put into the on-state for the subsidiary on-state time interval $Ts_{ON}$ between the second and the fourth time instants $t_2$ to $t_4$. The main switching device 28 and the subsidiary switching device 30 are alternately put into the on-state without the main on-state time interval $Tm_{ON}$ and the subsidiary on-state time interval $Ts_{ON}$ overlapped. In other words, the main switching device 28 and the subsidiary switching device 30 are put into the off-state for common off-state intervals between the first and the second time instants $t_1$ to $t_2$ and between the fourth and the fifth time instants $t_4$ to $t_5$.

In the main on-state time interval $Tm_{ON}$ between the zeroth and the first time instants $t_0$ to $t_1$, the main switching device 28 is turned on at the zeroth time instant $t_0$. At this time instant $t_0$, the primary winding 24 of the main transformer 16 is applied with a positive voltage as shown in FIG. 2C. In this event, the secondary winding voltage of ($V_{in} \cdot N_s / N_p$) appears at the secondary winding 26 of the main transformer 16 with the winding starting end 26a of the secondary winding 26 put into positive. Responsive to the secondary winding voltage, the gate electrode of the first MOSFET 40 is biased in a forward direction as shown in FIG. 2E and then the first MOSFET 40 is put into the on-state.

On the other hand, the first MOSFET 40 has a voltage drop of about 0.2 volts when the first MOSFET 40 is turned on. Responsive to the voltage drop, the gate electrode of the second MOSFET 42 is biased in a backward direction as shown in FIG. 2F. The second MOSFET 42 is therefore put into the off-state. In this state, a load current flows through a route which passes from the winding starting end 26a of the secondary winding 26 via the choking coil 44, the load resistor 14, the source electrode of the first MOSFET 40, and the drain electrode of the first MOSFET 40, to the winding ending end 26b of the secondary winding 26.

In addition, for the main on-state time interval $Tm_{ON}$ between the zeroth and the first time instants $t_0$ to $t_1$, the subsidiary switching device 30 is put into the off-state and a voltage of ($V_{in}+V_c$) is applied between the source and the drain electrodes of the subsidiary switching device 30.

For a time interval between the first and the second time instants $t_1$ to $t_2$, both of the main switching device 28 and the subsidiary switching device 30 are put into the off-state. Magnetic energy accumulated in the main transformer 16 for the main on-state time interval $Tm_{ON}$ between the zeroth and the first time instants $t_0$ to $t_1$ is absorbed by the clamping capacitor 32 through a route which passes from the winding ending end 24b of the primary winding 24 via the subsidiary switch parasitic diode 38, and the clamping capacitor 32, to the winding starting end 24a of the primary winding 24.

For a time interval between the second and the third time instants $t_2$ to $t_3$, the subsidiary switching device 30 is put into the on-state. Accordingly, magnetic energy accumulated in the main transformer 16 for the time interval between the first and the second time instants $t_1$ to $t_2$ is absorbed by the clamping capacitor 32 through a route which passes from the winding ending end 24b of the primary winding 24 via the source electrode of the subsidiary switching device 30, the drain electrode of the subsidiary switching device 30, and the clamping capacitor 32, to the winding starting end 24a of the primary winding 24. The subsidiary switching device 30 may be turned on any time instant for a time interval between the first and the third time instants $t_1$ to $t_3$.

For a time interval between the third and the fourth time instants $t_3$ to $t_4$, electrostatic energy accumulated in the clamping capacitor 32 for the time interval between the first and the third time instants $t_1$ to $t_3$ is absorbed by the main transformer 16 through a route which passes from the clamping capacitor 32 via the drain electrode of the subsidiary switching device 30, the source electrode of the subsidiary switching device 30, the winding ending end 24b of the primary winding 24, and the winding starting end 24a of the primary winding 24, to the clamping capacitor 32.

The subsidiary switching device 30 is turned off at the fourth time instant $t_4$. For a time interval between the fourth and the fifth time instants $t_4$ to $t_5$, electrostatic energy accumulated in the main switch parasitic capacitor 36 between the source and the drain electrodes of the main switching device 28 is absorbed by the main transformer 32 through a route which passes from the main switch parasitic capacitor 36 via the winding ending end 24b of the primary winding 24, the winding starting end 24a of the primary winding 24, the positive electrode of the input power source 12, and the negative electrode of the input power source 12, to the main switch parasitic capacitor 36.

A capacitance of the clamping capacitor 32 is selected so that a time constant defined by a primary inductance of the main transformer 16 and a capacitance of the clamping capacitor 32 is sufficiently longer than the switching period of the converter. Under the circumstances, the primary reset voltage of the main transformer 16 has a nearly linear resonance waveform which is clamped by the clamping capacitor 32 for a time interval between the first and the fourth time instants $t_1$ to $t_4$. In addition, for the time interval between the fourth and the fifth time instants $t_4$ to $t_5$, the primary reset voltage appearing at the primary winding 24 of the main transformer 16 has a resonance waveform which rapidly falls caused by the primary inductance of the main transformer 16 and a capacitance of the main switch parasitic capacitor 36. Consequently, the primary reset voltage appearing at the primary winding 24 of the main transformer 16 has a waveform which is nearly equal to a rectangular waveform.

For the main off-state time interval $Tm_{OFF}$ between the first and the fifth time instants $t_1$ to $t_5$, positive voltages are applied to the winding ending end 24a of the primary winding 24 and the winding ending end 26b of the secondary winding 26 in the main transformer 16, and then the secondary winding 26 of the main transformer 16 generates the secondary winding voltage of ($V_c \cdot N_s / N_p$) as the secondary reset voltage. Responsive to the secondary reset voltage, the gate electrode of the second MOSFET 42 is biased in the forward direction and then the second MOSFET 42 is put into the on-state. The second MOSFET 42 has a voltage drop which is nearly equal to 0.2 volts. Responsive to the voltage drop, the gate electrode of the first MOSFET 40 is biased in the backward direction and then the first MOSFET 40 is put into the off-state. The choking coil 44 releases magnetic energy, which is accumulated therein for the main on-state time interval $Tm_{ON}$ between the zeroth and the first time instants $t_0$ to $t_1$, to the load resistor 14. The load current flows through a route which passes from the choking coil 44 via the load resistor 14, the source electrode of the second MOSFET 42, and the drain electrode of the second MOSFET 42, to the choking coil 44.

As described above, the first and the second MOSFETs 40 and 42 are operable in synchronism with operation of the main switching device 28 by driving the gate electrodes of the first and the second MOSFETs 40 and 42 in response to the secondary winding voltage appearing the secondary winding 26 of the main transformer 16. That is, a combination of the main transformer 16, the primary and the secondary circuits 18 and 20, and the control circuit 22 serves as the synchronous rectifying circuit.

In the above-mentioned conventional synchronous rectifying circuit, the primary reset voltage appearing at the primary winding 24 of the main transformer 16 has a nearly rectangular waveform for the main off-state time interval $Tm_{OFF}$ between the first and the fifth time instants $t_1$ to $t_5$. As a result, the gate electrode of the second MOSFET 42 is continuously applied with an approximately constant voltage required to sufficiently turn the second MOSFET 42 on. Consequently, it is possible to reduce loss of the synchronous rectifying circuit. In addition, the primary reset voltage appearing at the primary winding 24 of the main transformer 16 hardly changes widely although an input condition or a load condition in the converter changes. As a result, it is possible to drive the second MOSFET 42 stably with respect to fluctuations of the input condition or the load condition in the converter.

Furthermore, it is possible to lower a peak value in the primary reset voltage appearing at the primary winding 24 of the main transformer 16. Accordingly, it is possible to use, as the main switching device 28 and the first MOSFET 40, low voltage-resistant parts, namely, parts having low on-resistance and low parasitic capacitance. Consequently, it is possible to reduce loss of the main switching device 28 and the first MOSFET 40.

In the conventional synchronous rectifying circuit of the active clamping type, the control terminals of the synchronous rectifying elements (namely, the gate electrodes of the first and the second MOSFETs 40 and 42) are driven by the secondary winding voltage appearing at the secondary winding 26 of the main transformer 16. The secondary winding voltage is determined by a design of a main circuit in the converter. Consequently, there are some cases where the control terminals of the synchronous rectifying elements cannot be applied with the optimum driving voltage and it results in decreasing loss of the synchronous rectifying circuit, as mentioned in the preamble of the instant specification.

In addition, when the synchronous rectifying elements are turned on, a large current flows through the parasitic capacitors 50 and 54, as shown at the time instants $t_0$, $t_5$, and so on in FIG. 2E and at the time instants $t_1$ and so on in FIG. 2F. Consequently, a ringing voltage having a large value appears between the control terminals and the common terminals of the synchronous rectifying elements (namely, the drain or the source electrodes of the first through the second MOSFETs 40 and 42) caused by resonance defined by the parasitic capacitance of the synchronous rectifiers 40 and 42, leakage inductance of the main transformer 16, parasitic inductance of current lines, and so on. As a result, the conventional synchronous rectifying circuit must use, as the synchronous rectifying elements high voltage-resistant elements and it results in increasing loss of the synchronous rectifying circuit, as mentioned in the preamble of the instant specification as well.

In addition, inasmuch as the secondary winding voltage appearing at the secondary winding 26 of the main transformer 16 is determined by the design of the main circuit in the converter, the secondary winding voltage appearing at the secondary winding 26 of the main transformer 16 is too larger to drive the control terminal of the synchronous rectifying elements 40 and 42 especially when the converter produces a high output d.c. voltage $V_o$ or when the input d.c. voltage $V_{in}$ is high. As a result, there are some cases where driving loss in the synchronous rectifying elements 40 and 42 becomes large, as mentioned also in the preamble of the instant specification.

Figure 3:
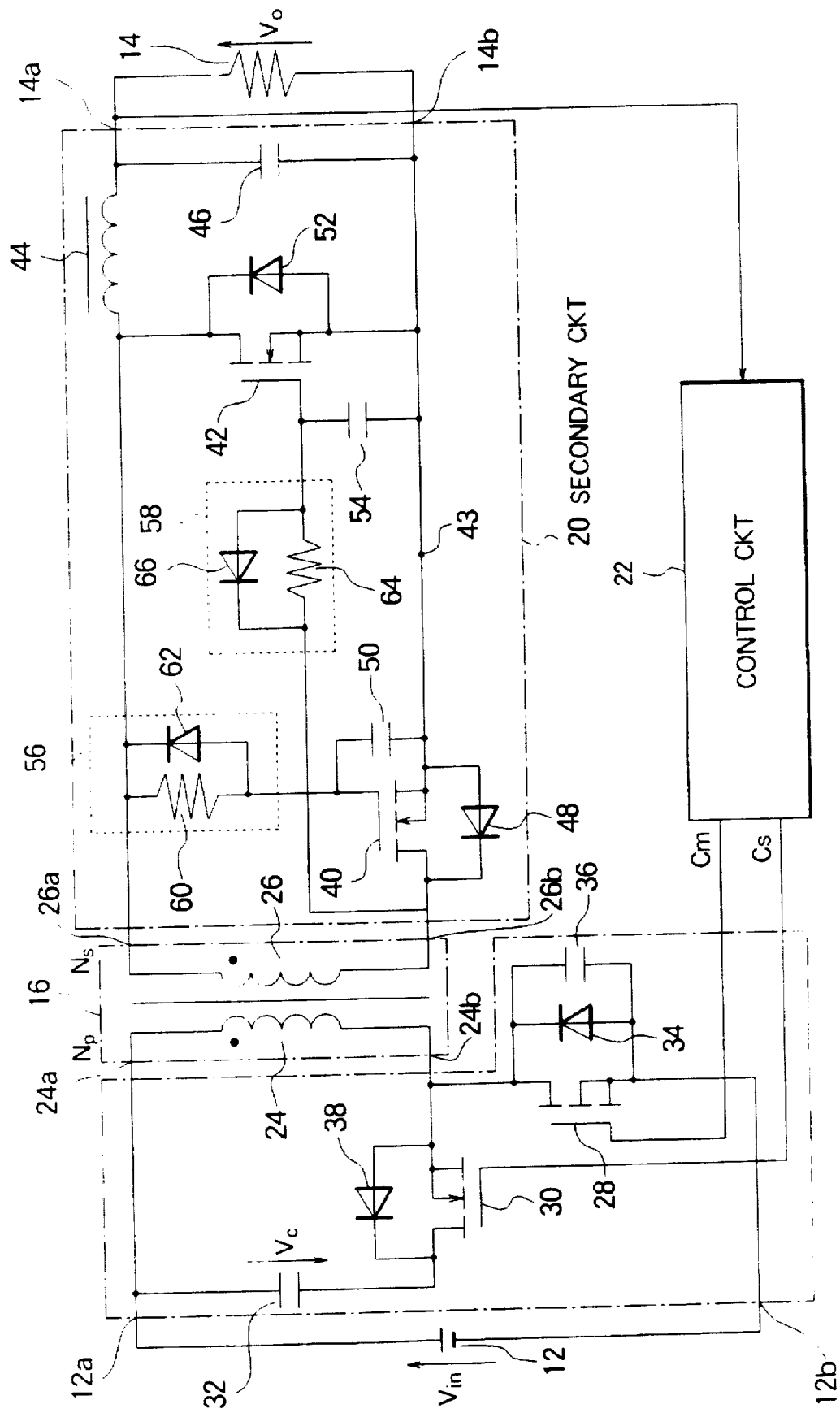
FIG. 3 is a block diagram of a synchronous rectifying circuit of an active clamping type according to a first embodiment of this invention.

Referring to FIG. 3, a synchronous rectifying circuit according to a first embodiment of this invention comprises similar parts designated by like reference numerals in those illustrated in FIG. 1. Like in FIG. 1, the illustrated synchronous rectifying circuit comprises the main transformer 16, the primary circuit 18, a secondary circuit 20, and the control circuit 22. In the example, the secondary circuit 20 is similar in structure to that illustrated in FIG. 1 except that the secondary circuit 20 further comprises first and second impedance circuits 56 and 58 but is operable is a manner similar to that illustrated in FIG. 1.

The first impedance circuit 56 is inserted between the winding starting end 26a of the secondary winding 26 of the main transformer 16 and the gate electrode of the first MOSFET 40. The first impedance circuit 56 comprises a first resistor 60 and a first diode 62 which are connected in parallel to one another. More specifically, the first resistor 60 has an end connected to the winding starting end 26a of the secondary winding 26 and another end connected to the gate electrode of the first MOSFET 40. The first diode 62 has a first anode electrode connected to the gate electrode of the first MOSFET 40 and a first cathode electrode connected to the winding starting end 26a of the secondary winding 26.

The second impedance circuit 58 is inserted between the winding ending end 26a of the secondary winding 26 of the main transformer 16 and the gate electrode of the second MOSFET 42. The second impedance circuit 58 comprises a second resistor 64 and a second diode 66 which are connected in parallel to one another. More specifically, the second resistor 66 has an end connected to the winding ending end 26b of the secondary winding 26 and another end connected to the gate electrode of the second MOSFET 42. The second diode 66 has a second anode electrode connected to the gate electrode of the second MOSFET 40 and a second cathode electrode connected to the winding ending end 26b of the secondary winding 26.

Figure 4:
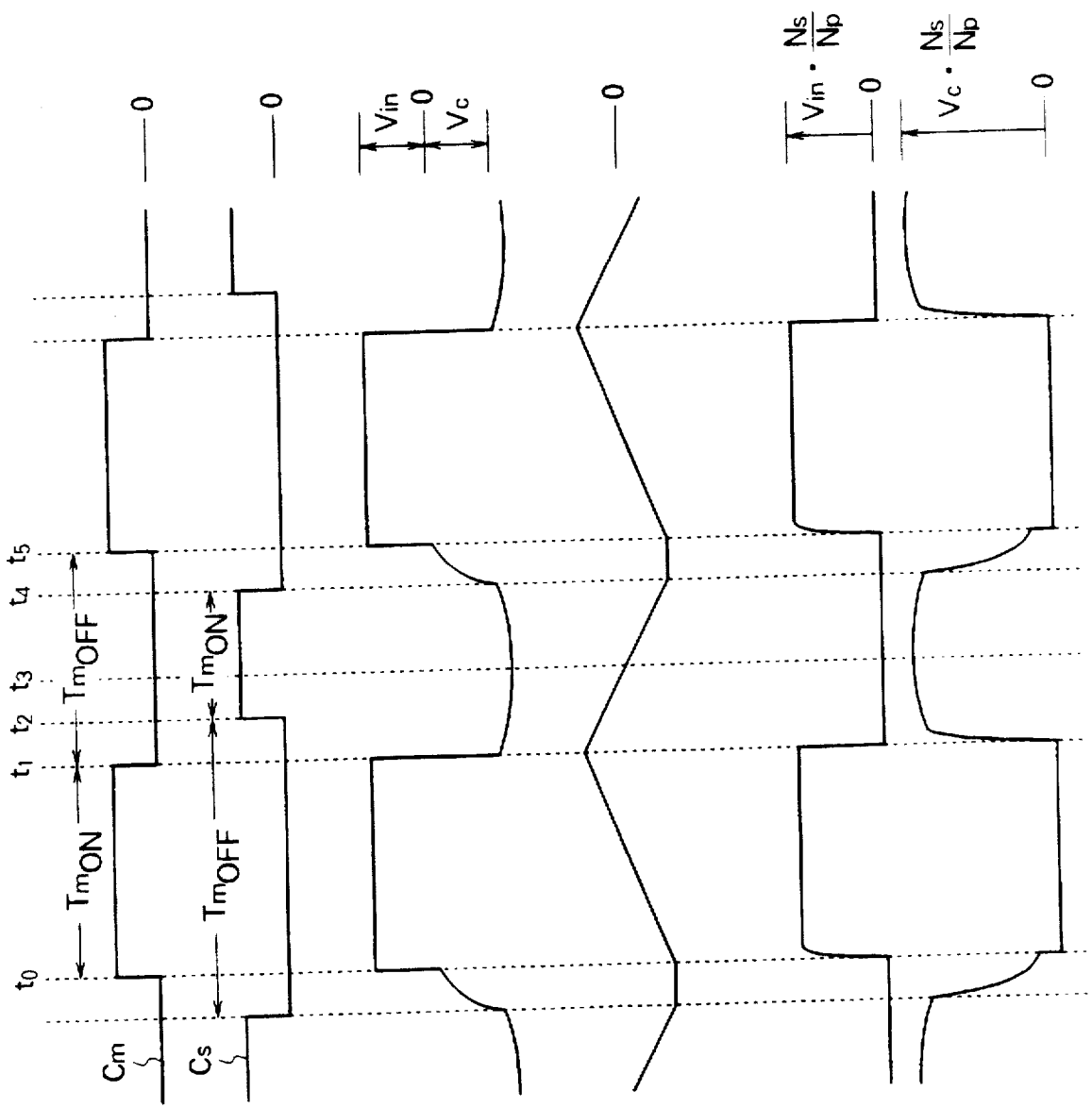
FIGS. 4A through 4F are time charts for use in describing operation of the synchronous rectifying circuit of the active clamping type illustrated in FIG. 3.

Referring to FIGS. 4A through 4F, description will be made about operation of the synchronous rectifying circuit illustrated in FIG. 3. FIG. 4A shows a waveform of the main switch control pulse signal Cm and FIG. 4B shows a waveform of the subsidiary switch control pulse signal Cs. FIG. 4C shows a voltage waveform of a primary winding voltage appearing at the primary winding 24 of the main transformer 16 and FIG. 4D shows a primary excitation current flowing through the primary winding 24 of the main transformer 16. In addition, FIG. 4E shows a voltage waveform of a first driving voltage appearing at the gate electrode of the first MOSFET 40 and FIG. 4F shows a voltage waveform of a second driving voltage appearing at the gate electrode of the second MOSFET 42.

As shown in FIGS. 4A and 4B, both of the main and the subsidiary switch control pulse signals Cm and Cs have the same switching period but the main and the subsidiary switch control pulse signals Cm and Cs have main and subsidiary on-state time intervals $Tm_{ON}$ and $Ts_{ON}$, respectively, which are shifted from one another without being overlapped. In other words, the main switch control pulse signal Cm has a main off-state time interval $Tm_{OFF}$ including the subsidiary on-state time interval $Ts_{ON}$ while the subsidiary switch control pulse signal Cs has a subsidiary off-time interval $Ts_{OFF}$ including the main on-state time intervals $Tm_{ON}$. The main and the subsidiary off-state time interval $Tm_{OFF}$ and $Ts_{OFF}$ are overlapped with one another.

The main switching device 28 is turned on at a zeroth time instant $t_0$ and is turned off at a first time instant $t_1$. The subsidiary switching device 30 is turned on at a second time instant $t_2$. At a third time instant $t_3$, the primary reset voltage appearing at the primary winding 24 of the main transformer 16 has the maximum. The subsidiary switching device 30 is turned off at a fourth time instant $t_4$. The main switching device 28 is turned on at a fifth time instant $t_5$ again. The main switching device 28 is put into an on-state for the main on-state time interval $Tm_{ON}$ between the zeroth and the first time instants $t_0$ to $t_1$ while the subsidiary switching device 30 is put into an on-state for the subsidiary on-state time interval $Ts_{ON}$ between the second and the fourth time instants $t_2$ to $t_4$. The main switching device 28 and the subsidiary switching device 30 are alternately put into the on-state without the main on-state time interval $Tm_{ON}$ and the subsidiary on-state time interval $Ts_{ON}$ overlapped. In other words, the main switching device 28 and the subsidiary switching device 30 are put into an off-state for common off-state intervals between the first and the second time instants $t_1$ to $t_2$ and between the fourth and the fifth time instants $t_4$ to $t_5$.

When the main switching device 28 is turned on at the zeroth time instant $t_0$, the winding starting end 24a of the primary winding 24 of the main transformer 16 is applied with a positive voltage as shown in FIG. 4C. At $(V_{in}·N_{s/Np})$ with the winding starting end 26a of the this time, the secondary winding 26 of the main transformer 16 generates a secondary winding voltage of secondary winding 26 put into positive.

For the main on-state time interval $Tm_{ON}$ between the zeroth and the first time instants $t_0$ to $t_1$, the main switching device 28 is put into the on-state. Consequently, an input current flows through a route which passes from the positive electrode of the input power source 12 via the winding starting end 24a of the primary winding 24 of the main transformer 16, the winding ending end 24b of the primary winding 24 of the main transformer 16, the drain electrode of the main switching device 28, and the source electrode of the main switching device 28, to the negative electrode of the input power source 12. Accordingly, the input current or the primary excitation current flowing the primary winding 24 of the main transformer 16 gradually increases with the passage of time as shown in FIG. 4D.

At the zeroth time instant $t_0$, the secondary winding voltage appearing at the secondary winding 26 of the main transformer 16 is applied to the gate electrode of the first MOSFET 40 via the first resistor 60 in the first impedance 56. Consequently, a first charging current flows in the gate electrode of the first MOSFET 40 through a route which passes from the winding starting end 26a of the secondary winding 26, the first resistor 60, the first FET parasitic capacitor 50, and the first FET parasitic diode 48, to the winding ending end 26b of the secondary winding 26. The first charging current or the first driving voltage gently stands up along a curve of a time constant defined by a resistance of the first resistor 60 and a capacitance of the first FET parasitic capacitor 50 as shown in FIG. 4E. Accordingly, the first MOSFET 40 is gently turned on.

On the other hand, at the zeroth time instant $t_0$, electric charges, which are accumulated in the second FET parasitic capacitor 54 for a time interval prior to the zeroth time instant $t_0$, discharge through a route which passes from the gate electrode of the second MOSFET 42 via the second diode 66 of the second impedance circuit 58, the winding ending end 26b of the secondary winding 26, the winding starting end 26a of the secondary winding 26, and the drain electrode of the second MOSFET 42, to the source electrode of the second MOSFET 42. Accordingly, the second MOSFET is rapidly turned off.

For the main on-state time interval $Tm_{ON}$ between the zeroth through the first time instants $t_0$ to $t_1$, a load current flows through a route which passes from the winding starting end 26a of the secondary winding 26 of the main transformer 16 via the choking coil 44, the load resistor 14, the source electrode of the first MOSFET 40, and the drain electrode of the first MOSFET 40, to the winding ending end 26b of the secondary winding 26.

In addition, for the main on-state time interval $Tm_{ON}$ between the zeroth through the first time instants $t_0$ to $t_1$, the subsidiary switching device 30 is put into the off-state. In this time, a voltage of $(V_{in}+V_c)$ is applied between the source and the drain electrodes of the subsidiary switching device 30.

Inasmuch as operation of the primary circuit 18 of the converter is similar to that of the conventional synchronous rectifying circuit illustrated in FIG. 1 for the main off-state time interval $Tm_{OFF}$ between the first and the fifth time instants $t_1$ to $t_5$, description thereto are omitted.

When the main switching device 28 is turned off at the first time instant $t_1$, the primary and the secondary windings 24 and 26 generate primary and secondary reset voltages, respectively. Consequently, the secondary reset voltage of $(V_c·N_s/N_p)$ appears at the secondary winding 26 of the main transformer 16. Responsive to the secondary reset voltage, a second charging current flows in the gate electrode of the second MOSFET 42 through a route which passes from the winding ending end 26b of the secondary winding 26 via the second resistor 64 in the second impedance circuit 58, the second FET parasitic capacitor 54, and the second FET parasitic diode 52, to the winding starting end 26a of the secondary winding 26. The second charging current or the second driving voltage gently stands up along a curve of a time constant defined by a resistance of the second resistor 64 and a capacitance of the second FET parasitic capacitor 54 as shown in FIG. 4F. Accordingly, the second MOSFET 42 is gently turned on.

On the other hand, at the first time instant $t_1$, electric charges, which are accumulated in the first FET parasitic capacitor 50 for a time interval prior to the first time instant $t_1$, discharge through a route which passes from the gate electrode of the first MOSFET 40 via the first diode 62 of the first impedance circuit 56, the winding starting end 26a of the secondary winding 26, the winding ending end 26b of the secondary winding 26, and the drain electrode of the first MOSFET 40, to the source electrode of the first MOSFET 40. Accordingly, the first MOSFET 40 is rapidly turned off.

As a result, the choking coil 44 releases magnetic energy accumulated for the main on-state time interval $Tm_{ON}$ to the load resistor 14 for the main off-state time interval $Tm_{OFF}$ between the first and the fifth time instants $t_1$ to $t_5$. The load current flows through a route which passes from the choking coil 44 via the load resistor 14, the source electrode of the second MOSFET 42, and the drain electrode of the second MOSFET 42, to the choking coil 44.

With this structure, the maximum value of the first and the second charging currents flowing in the gate electrodes of the first and the second MOSFETs 40 and 42 is restricted by the first and the second resistors 60 and 64 and the first and the second charging currents flow along the curve of the time constant. Consequently, it is possible to reduce the ringing voltages appearing at the gate electrodes of the first and the second MOSFETs 40 and 42. Accordingly, it is possible to use, as the first and the second MOSFETs 40 and 42, low voltage-resistant parts. That is to say, it is possible to use, as the first and the second MOSFETs 40 and 40, MOSFETs having low on-resistance and having low parasitic capacitance.

It is assumed that the first and the second impedance circuits 56 and 58 comprise only the first and the second resistors 60 and 64, respectively. In this case, only the first and the second resistors 60 and 64 are connected to the gate electrodes of the first and the second MOSFETs 40 and 42, respectively. In this event, first and second discharging currents flowing out the first and the second FET parasitic capacitors 50 and 54 are restricted by the first and the second resistors 60 and 64, respectively. With restriction of the first and the second discharging currents, turning-off of the first and the second MOSFETS 40 and 42 is delayed and it results in increasing loss of the synchronous rectifying circuit.

To solve such a delay in the turning-off of the first and the second MOSFETs 40 and 42, the first and the second diodes 62 and 66 are connected in parallel to the first and the second resistors 60 and 64, respectively, to as to rapidly discharge the electric charges accumulated in the first and the second FET parasitic capacitors 50 and 54 via the first and the second diodes 62 and 66, respectively. Consequently, it is possible to rapidly turn off the first and the second MOSFETs 40 and 42 and then it is possible to decrease loss caused by the delay in the turning-off of the first and the second MOSFETs 40 and 42.

Figure 5:
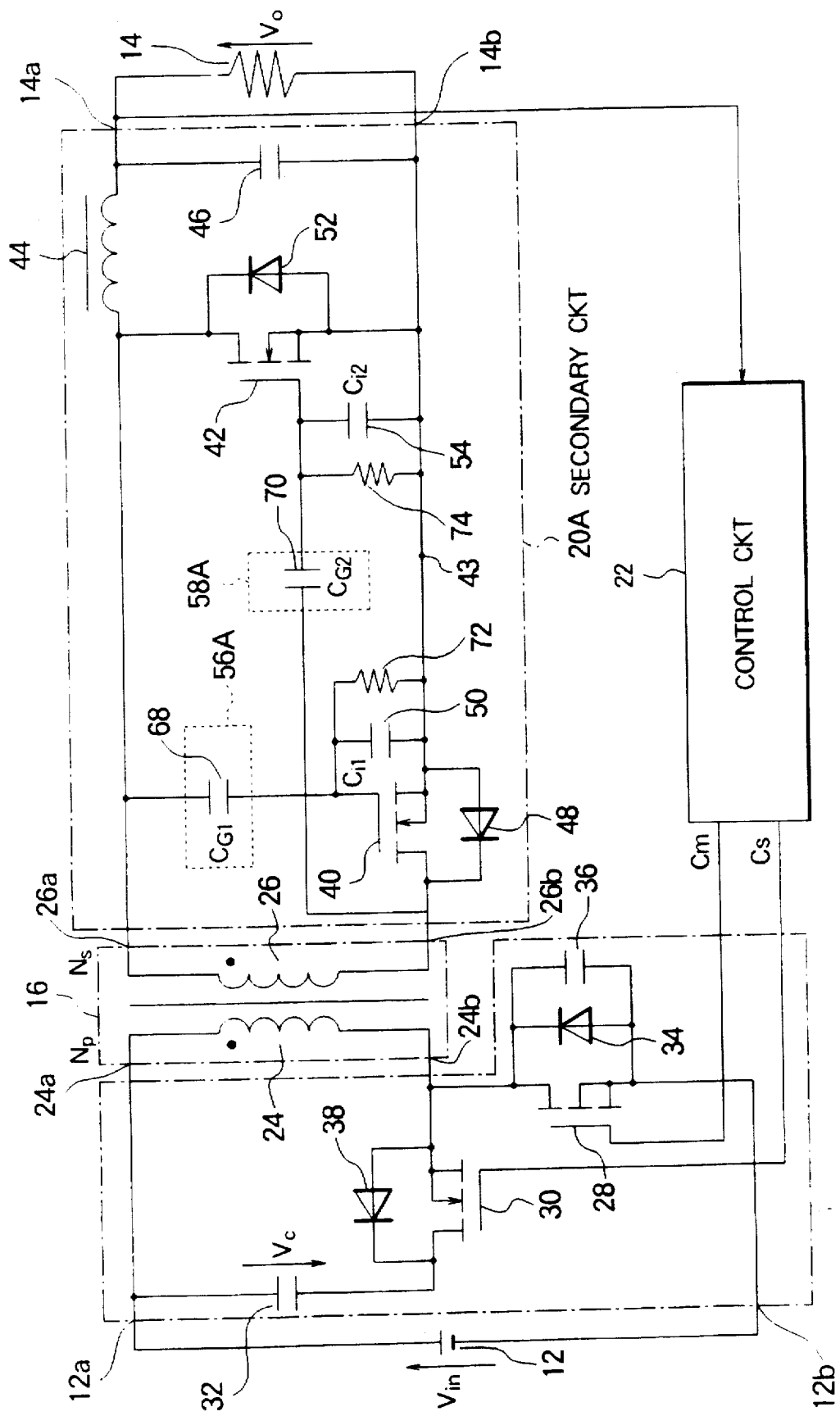
FIG. 5 is a block diagram of a synchronous rectifying circuit of an active clamping type according to a second embodiment of this invention.

Referring to FIG. 5, a synchronous rectifying circuit according to a second embodiment of this invention is similar in structure and operation to that illustrated in FIG. 3 except that the secondary circuit is modified from that illustrated in FIG. 3 as will later become clear. The secondary circuit is therefore depicted at 20A. The illustrated synchronous rectifying circuit comprises similar parts designated by like reference numerals in those illustrated in FIG. 3 and description thereto is omitted because of simplification of description.

The secondary circuit 20A is similar in structure and operation to that illustrated in FIG. 3 except that the first and the second impedance circuits are modified from that illustrated in FIG. 3 as will later become clear. The first and the second impedance circuits are therefore depicted at 56A and 58A, respectively.

The first impedance circuit 56A comprises a first capacitor 68. The first capacitor 68 has an end connected to the gate electrode of the first MOSFET 40 and another end connected to the winding stating end 26a of the secondary winding 26. In addition, in order to stabilize a first gate voltage for the first MOSFET 40, the first MOSFET 40 is provided with a resistor 72 which is connected in parallel to the first FET parasitic capacitor 50. That is, the resistor 72 has an end connected to the gate electrode of the first MOSFET 40 and another end connected to the source electrode of the first MOSFET 40 or the node 43.

The second impedance circuit 58A comprises a second capacitor 70. The second capacitor 70 has an end connected to the gate electrode of the second MOSFET 42 and another end connected to the winding ending end 26b of the secondary winding 26. In addition, in order to stabilize a second gate voltage for the second MOSFET 42, the second MOSFET 42 is provided with another resistor 74 which is connected in parallel to the second FET parasitic capacitor 54. That is, the resistor 74 has an end connected to the gate electrode of the second MOSFET 42 and another end connected to the source electrode of the second MOSFET 42 or the node 43.

It is assumed that the first and the second capacitors 68 and 70 have first and second capacitance represented by $C_{G1}$ and $C_{G2}$, respectively, and the first and the second FET parasitic capacitors 50 and 54 have first and second capacitance represented by $C_{i1}$ and $C_{i2}$, respectively.

Figure 6:
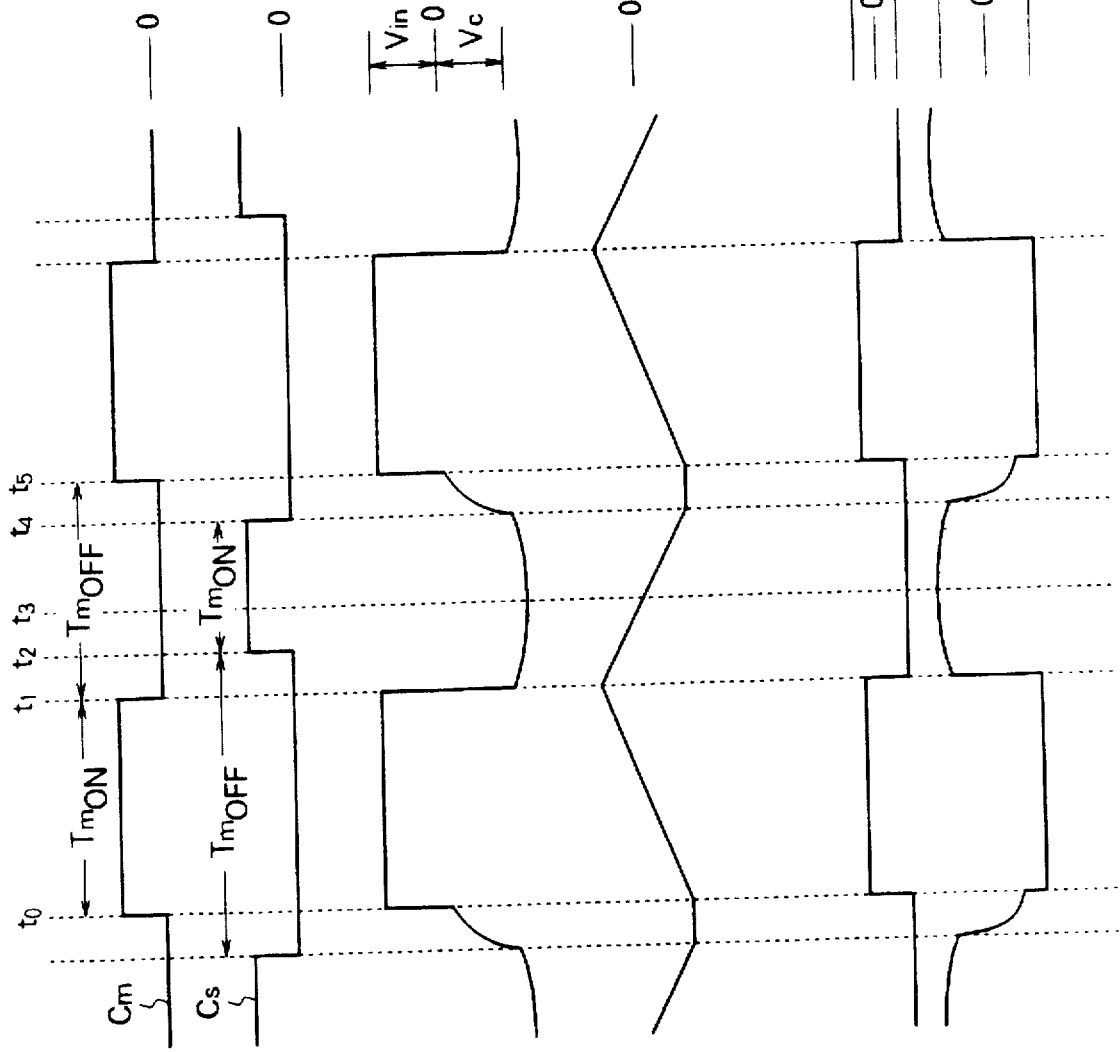
FIGS. 6A through 6F are time charts for use in describing operation of the synchronous rectifying circuit of the active clamping type illustrated in FIG. 5.

Referring to FIGS. 6A through 6F, description will be made about operation of the synchronous rectifying circuit illustrated in FIG. 5. FIG. 6A shows a waveform of the main switch control pulse signal Cm and FIG. 6B shows a waveform of the subsidiary switch control pulse signal Cs. FIG. 6C shows a voltage waveform of a primary winding voltage appearing at the primary winding 24 of the main transformer 16 and FIG. 6D shows a primary excitation current flowing through the primary winding 24 of the main transformer 16. In addition, FIG. 6E shows a voltage waveform of a first driving voltage appearing at the gate electrode of the first MOSFET 40 and FIG. 6F shows a voltage waveform of a second driving voltage appearing at the gate electrode of the second MOSFET 42.

As shown in FIGS. 6A and 6B, both of the main and the subsidiary switch control pulse signals Cm and Cs have the same switching period but the main and the subsidiary switch control pulse signals Cm and Cs have main and subsidiary on-state time intervals $Tm_{ON}$ and $Ts_{ON}$, respectively, which are shifted from one another without they overlapped. In other words, the main switch control pulse signal Cm has a main off-state time interval $Tm_{OFF}$ including the subsidiary on-state time interval $Ts_{ON}$ while the subsidiary switch control pulse signal Cs has a subsidiary off-time interval $Ts_{OFF}$ including the main on-state time intervals $Tm_{ON}$. The main and the subsidiary off-state time interval $Tm_{OFF}$ and $Ts_{OFF}$ are overlapped with one another.

The main switching device 28 is turned on at a zeroth time instant $t_0$ and is turned off at a first time instant $t_1$. The subsidiary switching device 30 is turned on at a second time instant $t_2$. At a third time instant $t_3$, the primary reset voltage appearing at the primary winding 24 of the main transformer 16 has the maximum. The subsidiary switching device 30 is turned off at a fourth time instant $t_4$. The main switching device 28 is turned on at a fifth time instant $t_5$ again. The main switching device 28 is put into an on-state for the main on-state time interval $Tm_{ON}$ between the zeroth and the first time instants $t_0$ to $t_1$ while the subsidiary switching device 30 is put into an on-state for the subsidiary on-state time interval $Ts_{ON}$ between the second and the fourth time instants $t_2$ to $t_4$. The main switching device 28 and the subsidiary switching device 30 are alternately put into the on-state without the main on-state time interval $Tm_{ON}$ and the subsidiary on-state time interval $Ts_{ON}$ overlapped. In other words, the main switching device 28 and the subsidiary switching device 30 are put into an off-state for common off-state intervals between the first and the second time instants $t_1$ to $t_2$ and between the fourth and the fifth time instants $t_4$ to $t_5$.

Inasmuch as operation of the primary circuit 18 of the converter is similar to that of the synchronous rectifying circuit illustrated in FIG. 3 for the main on-state time interval $Tm_{ON}$ between the zeroth and the first time instants $t_0$ to $t_1$, description thereto is omitted.

At the zeroth time instant $t_0$, the main switching device 28 is turned on. In this event, the secondary winding 26 of the main transformer 16 generates a secondary winding voltage of $(V_{in} \cdot N_s/N_p)$. The secondary winding voltage is applied to the gate electrode of the first MOSFET 40 through the first capacitor 68 in the first impedance circuit 65A. Consequently, a first charging current rapidly flows in the gate electrode of the first MOSFET 40 through a route which passes from the winding starting end 26a of the secondary winding 26 via the first capacitor 68, the first FET parasitic capacitor 50, and the first FET parasitic diode 48, to the winding ending end 26b of the secondary winding 26. The first charging current or the first driving voltage rapidly stands up as shown in FIG. 6E. Accordingly, the first MOSFET 40 is turned rapidly on. In addition, between the gate and the source electrodes of the first MOSFET 40 is applied a first divided voltage caused by the first FET parasitic capacitor 50 and the first capacitor 68 that is represented by $[V_{in} \cdot (N_s/N_p) \cdot \{C_{G1}/(C_{G1}+C_{i1})\}]$.

On the other hand, at the zeroth time instant $t_0$, electric charges, which are accumulated in the second FET parasitic capacitor 54 for a time interval prior to the zeroth time instant $t_0$, rapidly discharge through a route which passes from the gate electrode of the second MOSFET 42 via the second capacitor 70 of the second impedance circuit 58A, the winding ending end 26b of the secondary winding 26, the winding starting end 26a of the secondary winding 26, and the drain electrode of the second MOSFET 42, to the source electrode of the second MOSFET 42. Accordingly, the second MOSFET 42 is turned rapidly off.

Inasmuch as operation of the primary circuit 18 in the converter is similar to that of the conventional synchronous rectifying circuit illustrated in FIG. 1 for the main off-state time interval $Tm_{OFF}$ between the first and the fifth time instants $t_1$ to $t_5$, description thereto is omitted.

When the main switching device 28 is turned off at the first time instant $t_1$, the primary and the secondary windings 24 and 26 of the main transformer 16 generate the primary reset voltage of $V_c$ and the secondary reset voltage of $(V_c \cdot N_s/N_p)$, respectively. Responsive to the secondary reset voltage, a second charging current rapidly flows in the gate electrode of the second MOSFET 42 through a route which passes from the winding ending end 26b of the secondary winding 26 via the second capacitor 70 in the second impedance circuit 58A, the second FET parasitic capacitor 54, and the second FET parasitic diode 52, to the winding starting end 26a of the secondary winding 26. The second charging current or the second driving voltage rapidly stands up as shown in FIG. 6F. Accordingly, the second MOSFET 42 is turned rapidly on. In addition, between the gate and the source electrodes of the second MOSFET 42 is applied a second divided voltage caused by the second FET parasitic capacitor 54 and the second capacitor 70 that is represented by $[V_c \cdot (N_s/N_p) \cdot \{C_{G2}/(C_{G2}+C_{i2})\}]$.

On the other hand, at the first time instant $t_1$, electric charges, which are accumulated in the first FET parasitic capacitor 50 for the main on-state time interval $Tm_{ON}$ between the zeroth and the first time instants $t_0$ and $t_1$, rapidly discharge through a route which passes from the gate electrode of the first MOSFET 40 via the first capacitor 68 of the first impedance circuit 56A, the winding starting end 26a of the secondary winding 26, the winding ending end 26b of the secondary winding 26, and the drain electrode of the first MOSFET 40, to the source electrode of the first MOSFET 40. Accordingly, the first MOSFET 40 is turned rapidly off.

As described above, the voltage between the gate and the source electrodes of the first MOSFET 40 is equal to the voltage into which the secondary winding voltage $(V_{in} \cdot N_s/N_p)$ or the secondary reset voltage $(V_c \cdot N_s/N_p)$ appearing at the secondary winding 26 is divided by the first FET parasitic capacitor 50 and the first capacitor 68. Accordingly, it is possible to adjust the first capacitance $C_{G1}$ of the first capacitor 68 with respect to the first FET parasitic capacitor 50 so that the gate voltage of the first MOSFET 40 becomes the optimum voltage to drive the gate electrode of the first MOSFET 40.

Similarly, the voltage between the gate and the source electrodes of the second MOSFET 42 is equal to the voltage into which the secondary winding voltage $(V_{in} \cdot N_s/N_p)$ or the secondary reset voltage $(V_c \cdot N_s/N_p)$ appearing at the secondary winding 26 is divided by the second FET parasitic capacitor 54 and the second capacitor 70. Accordingly, it is possible to adjust the second capacitance $C_{G2}$ of the second capacitor 70 with respect to the second FET parasitic capacitor 54 so that the gate voltage of the second MOSFET 42 becomes the optimum voltage to drive the gate electrode of the second MOSFET 42.

The synchronous rectifying circuit illustrated in FIG. 5 is advantageous in that a first input capacitance between the gate and the source electrodes of the first MOSFET 40 decreases from $C_{i1}$ to $\{C_{G1} \cdot C_{i1}/(C_{G1}+C_{i1})\}$ and that a second input capacitance between the gate and the source electrodes of the second MOSFET 42 decreases from $C_{i2}$ to $\{C_{G2} \cdot C_{i2}/(C_{G2}+C_{i2})\}$. Consequently, it is possible to reduce first and second driving currents flowing in the gate electrodes of the first and the second MOSFETs 40 and 42. As a result, it is possible to decrease gate driving loss in the first and the second MOSPETs 40 and 42.

Figure 7:
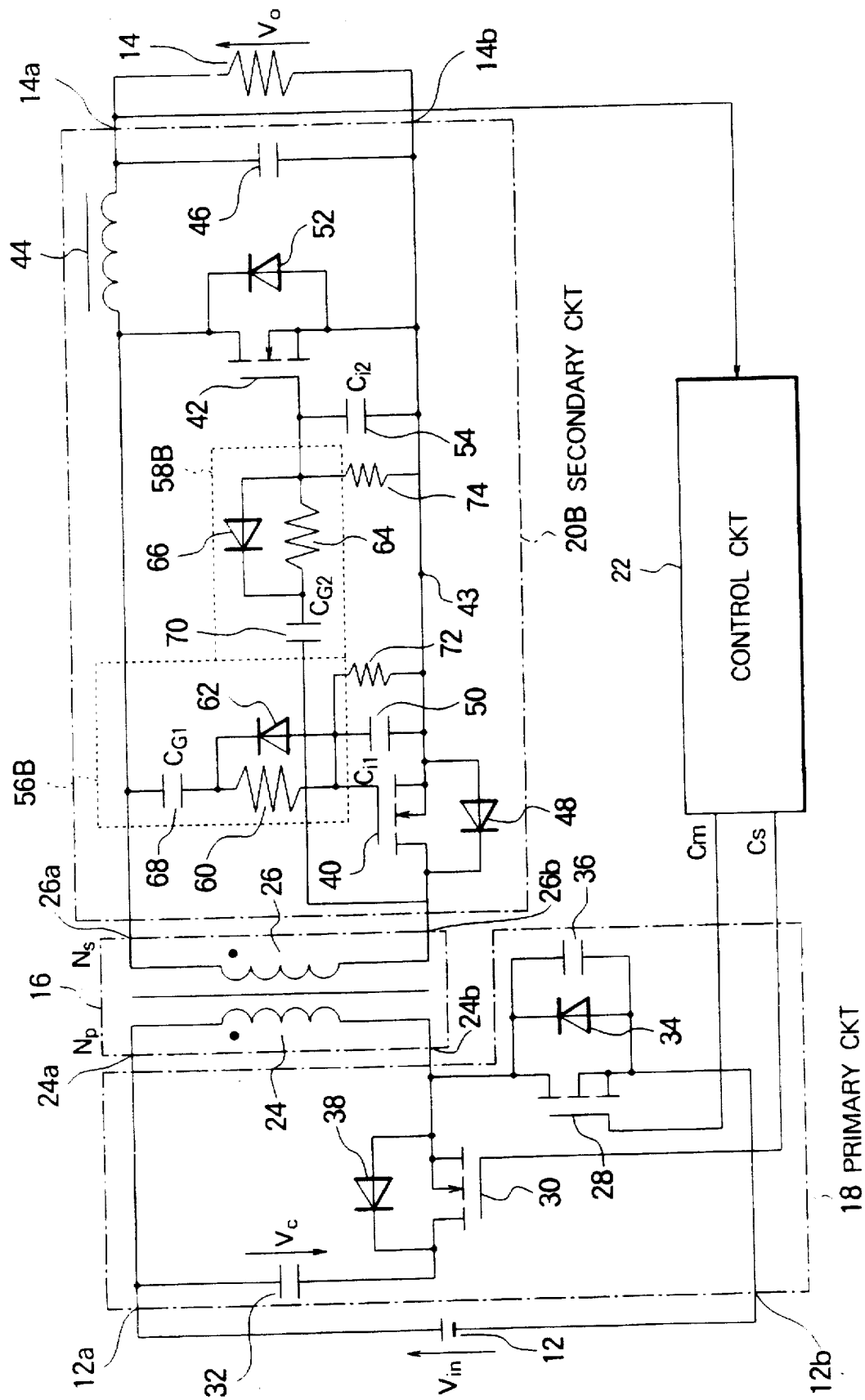
FIG. 7 is a block diagram of a synchronous rectifying circuit of an active clamping type according to a third embodiment of this invention.

Referring to FIG. 7, a synchronous rectifying circuit according to a third embodiment of this invention is similar in structure and operation to that illustrated in FIG. 5 except that the secondary circuit is modified from that illustrated in FIG. 5 as will later become clear. The secondary circuit is therefore depicted at 20B. The illustrated synchronous rectifying circuit comprises similar parts designated by like reference numerals in those illustrated in FIG. 5 and description thereto is omitted because of simplification of description.

The secondary circuit 20B is similar in structure and operation to that illustrated in FIG. 5 except that the first and the second impedance circuits are modified from that illustrated in FIG. 5 as will later become clear. The first and the second impedance circuits are therefore depicted at 56B and 58B, respectively.

The first impedance circuit 56B comprises the first resistor 60, the first diode 62, and the first capacitor 68. More specifically, an end of the first capacitor 68 is connected to the winding stating end 26a of the secondary winding 26 and another end of the first capacitor 68 is connected to an end of the first resistor 60 and to the first cathode electrode of the first diode 62. Another end of the first resistor 60 and the first anode electrode of the first diode 62 are connected to the gate electrode of the first MOSFET 40.

The second impedance circuit 58B comprises the second resistor 64, the first diode 66, and the first capacitor 70. More specifically, an end of the second capacitor 70 is connected to the winding ending end 26b of the secondary winding 26 and another end of the second capacitor 70 is connected to an end of the second resistor 64 and to the second cathode electrode of the second diode 66. Another end of the second resistor 64 and the second anode electrode of the second diode 66 are connected to the gate electrode of the second MOSFET 42.

Like in FIG. 5, it is assumed that the first and the second capacitors 68 and 70 have first and second capacitance represented by $C_{G1}$ and $C_{G2}$, respectively, and that the first and the second FET parasitic capacitors 50 and 54 have first and second capacitance represented by $C_{i1}$ and $C_{i2}$, respectively.

Referring to FIGS. 8A to 8F, description will be made about operation of the synchronous rectifying circuit illustrated in FIG. 7. Inasmuch as description of FIGS. 8A to 8F is similar to those of FIGS. 4A to 4F and FIGS. 6A to 6F, description thereto is omitted.

Figures 8A, 8B, 8C, 8D, 8E, 8F:
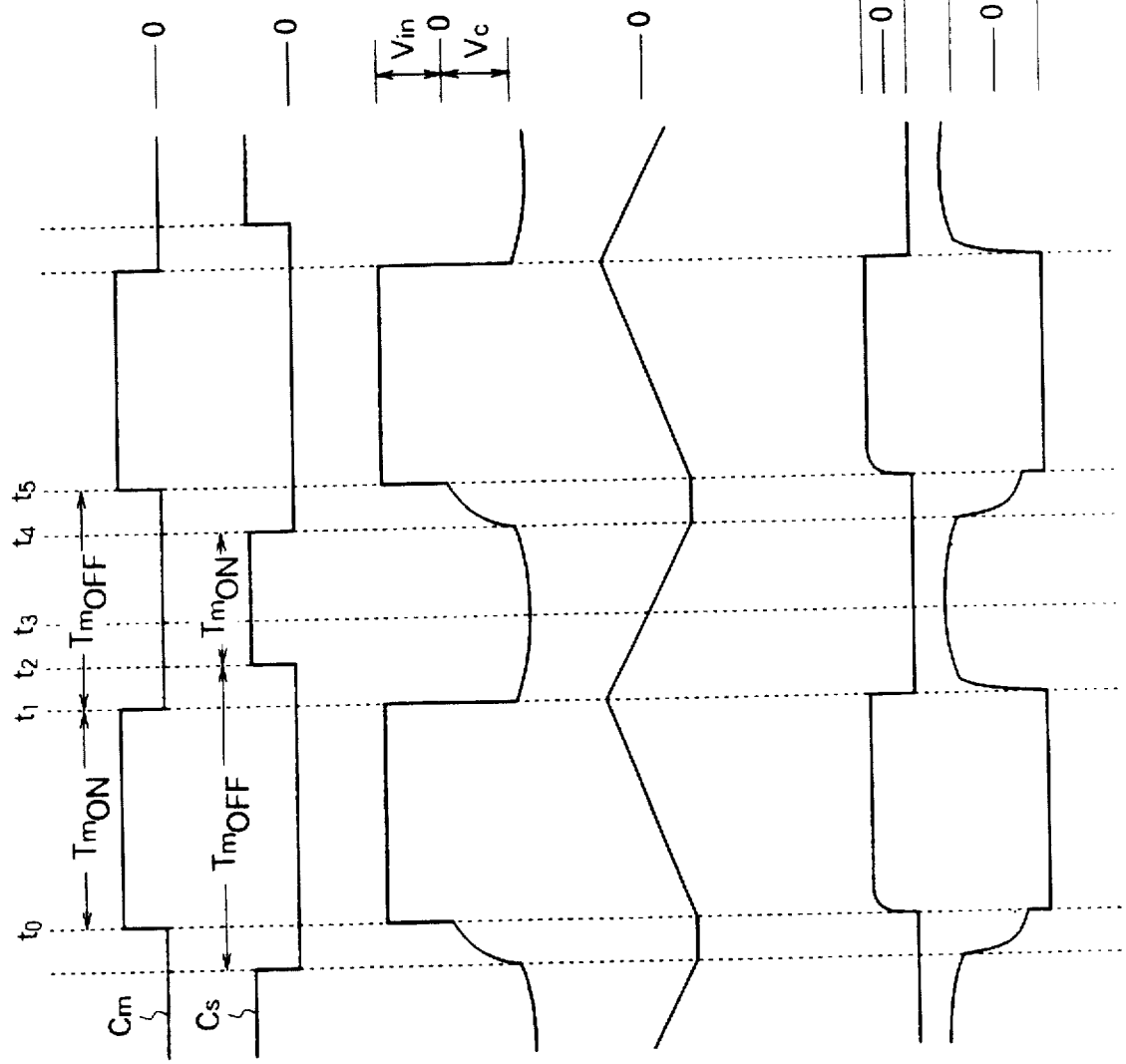
FIGS. 8A through 8F are time charts for use in describing operation of the synchronous rectifying circuit of the active clamping type illustrated in FIG. 7.

Like in FIGS. 4A to 4F and FIGS. 6A to 6F, both of the main and the subsidiary switch control pulse signals Cm and Cs have the same switching period but the main and the subsidiary switch control pulse signals Cm and Cs have the main and the subsidiary on-state time intervals $Tm_{ON}$ and $Ts_{ON}$, respectively, which are shifted from one another without they overlapped, as shown in FIGS. 8A and 8B. In other words, the main switch control pulse signal Cm has the main off-state time interval $Tm_{OFF}$ including the subsidiary on-state time interval $Ts_{ON}$ while the subsidiary switch control pulse signal Cs has the subsidiary off-time interval $Ts_{OFF}$ including the main on-state time intervals $Tm_{ON}$. The main and the subsidiary off-state time interval $Tm_{OFF}$ and $Ts_{OFF}$ are overlapped with one another. In other words, the main switching device 28 and the subsidiary switching device 30 are put into the off-state for the common off-state intervals between the first and the second time instants $t_1$ to $t_2$ and between the fourth and the fifth time instants $t_4$ to $t_5$. Accordingly, description will be made about operation related to the first and the second impedance circuits 56B and 58B alone.

At the zeroth time instant $t_0$, the main switching device 28 is turned on. In this event, the secondary winding 26 of the main transformer 16 generates the secondary winding voltage of $(V_{in} \cdot N_s/N_p)$. The secondary winding voltage is applied to the gate electrode for the first MOSFET 40 through the first capacitor 68 and the first resistor 60 in the first impedance circuit 56B. Consequently, a first charging current gently flows in the gate electrode of the first MOSFET 40 through a route which passes from the winding starting end 26a of the secondary winding 26 via the first capacitor 68, the first resistor 60, the first FET parasitic capacitor 50, and the first FET parasitic diode 48, to the winding ending end 26b of the secondary winding 26. The first charging current or the first driving voltage gently stands up along a curve of a time constant defined by a resistance of the first resistor 60 and a combined capacitance of the first FET parasitic capacitor 50 and the first capacitor 68 which are connected in series, as shown in FIG. BE. Accordingly, the first MOSFET 40 is turned gently on. In addition, between the gate and the source electrodes of the first MOSFET 40 is applied the first divided voltage caused by the first FET parasitic capacitor 50 and the first capacitor 68 that is represented by $[V_{in} \cdot (N_s/N_p) \cdot \{C_{G1}/(C_{G1}+C_{i1})\}]$.

On the other hand, at the zeroth time instant $t_0$, electric charges accumulated in the second FET parasitic capacitor 54 rapidly discharge through a route which passes from the gate electrode of the second MOSFET 42 via a parallel circuit composed of the second resistor 64 and the the second diode 66, the second capacitor 70 of the second impedance circuit 58B, the winding ending end 26b of the secondary winding 26, the winding starting end 26a of the secondary winding 26, and the drain electrode of the second MOSFET 42, to the source electrode of the second MOSFET 42. Accordingly, the second MOSFET 42 is turned rapidly off.

Inasmuch as operation of the primary circuit 18 in the converter is similar to that of the conventional synchronous rectifying circuit illustrated in FIG. 1 for the main off-state time interval $Tm_{OFF}$ between the first and the fifth time instants $t_1$ to $t_5$, description thereto is omitted.

When the main switching device 28 is turned off at the first instant $t_1$, the primary and the secondary windings 24 and 26 of the main transformer 16 generate the primary reset voltage of $V_c$ and the secondary reset voltage of $(V_c \cdot N_s/N_p)$, respectively. Responsive to the secondary reset voltage, a second charging current gently flows in the gate electrode of the second MOSFET 42 through a route which passes from the winding ending end 26b of the secondary winding 26 via the second capacitor 70 and the second resistor 64 in the second impedance circuit 58B, the second FET parasitic capacitor 54, and the second FET parasitic diode 52, to the winding starting end 26a of the secondary winding 26. The second charging current or the second driving voltage gently stands up along a curve of a time constant defined by a resistance of the second resistor 64 and a combined capacitance of the second FET parasitic capacitor 54 and the second capacitor 70 which are connected in series, as shown in FIG. 8F. Accordingly, the second MOSFET 42 is turned gently on. In addition, between the gate and the source electrodes of the second MOSFET 42 is applied the second divided voltage caused by the second FET parasitic capacitor 54 and the second capacitor 70 that is represented by $[V_c \cdot (N_s/N_p) \cdot \{C_{G2}/(C_{G2}+C_{i2})\}]$.

On the other hand, at the first time instant $t_1$, electric charges, which are accumulated in the first FET parasitic capacitor 50 for the main on-state time interval $Tm_{ON}$ between the zeroth and the first time instants $t_0$ and $t_1$, rapidly discharge through a route which passes from the gate electrode of the first MOSFET 40 via the first diode 62 and the first capacitor 68 of the first impedance circuit 56B, the winding starting end 26a of the secondary winding 26, the winding ending end 26b of the secondary winding 26, and the drain electrode of the first MOSFET 40, to the source electrode of the first MOSFET 40. Accordingly, the first MOSFET 40 is turned rapidly off.

With this structure, the maximum value of the first and the second charging currents flowing in the gate electrodes of the first and the second MOSFETs 40 and 42 is restricted by the first and the second resistors 60 and 64 and then the first and the second charging currents flow along the curve of the above-mentioned time constants. Consequently, it is possible to reduce the ringing voltage appearing at the gate electrodes of the first and the second MOSFETs 40 and 42. Accordingly, it is possible to use, as the first and the second MOSFETs 40 and 42, low voltage-resistant parts. That is to say, it is possible to use, as the first and the second MOSFETs 40 and 42, MOSFETs having low on-resistance and having low parasitic capacitance.

In addition, inasmuch as the first and the second diodes 62 and 66 are connected in parallel to the first and the second resistors 60 and 64, respectively, the electric charges accumulated in the first and the second FET parasitic capacitors 50 and 54 are rapidly discharged through the first and the second diodes 62 and 66, respectively. Consequently, it is possible to rapidly turn off the first and the second MOSFETs 40 and 42 and it results in decreasing loss caused by a delay in the turning-off of the first and the second MOSFETs 40 and 42.

Furthermore, the voltage between the gate and the source electrodes of the first MOSFET 40 is equal to the voltage into which the secondary winding voltage ($V_{in} \cdot N_s/N_p$) or the secondary reset voltage ($V_c \cdot N_s/N_p$) of the secondary winding 26 is divided by the first FET parasitic capacitor 50 and the first capacitor 68. Accordingly, it is possible to adjust the first capacitance $C_{G1}$ of the first capacitor 68 so as to drive the gate electrode of the first MOSFET 40 by the optimum voltage. Similarly, the voltage between the gate and the source electrodes of the second MOSFET 42 is equal to the ($V_{in} \cdot N_s/N_p$) or the secondary reset voltage ($V_c \cdot N_s/N_p$) voltage into which the secondary winding voltage of the secondary winding 26 is divided by the second FET parasitic capacitor 54 and the second capacitor 70. Accordingly, it is possible to adjust the second capacitance $C_{G2}$ of the second capacitor 70 so as to drive the gate electrode of the second MOSFET 42 by the optimum voltage.

In addition, a first input capacitance between the gate and the source electrodes of the first MOSFET 40 decreases from $C_{i1}$ to $\{C_{G1} \cdot C_{i1}/(C_{G1}+C_{i1})\}$ and a second input capacitance between the gate and the source electrodes of the second MOSFET 42 decreases from $C_{i2}$ to $\{C_{G2} \cdot C_{i2}/(C_{G2}+C_{i2})\}$. Consequently, it is possible to decrease gate driving loss in the first and the second MOSFETs 40 and 42.

Figure 9:
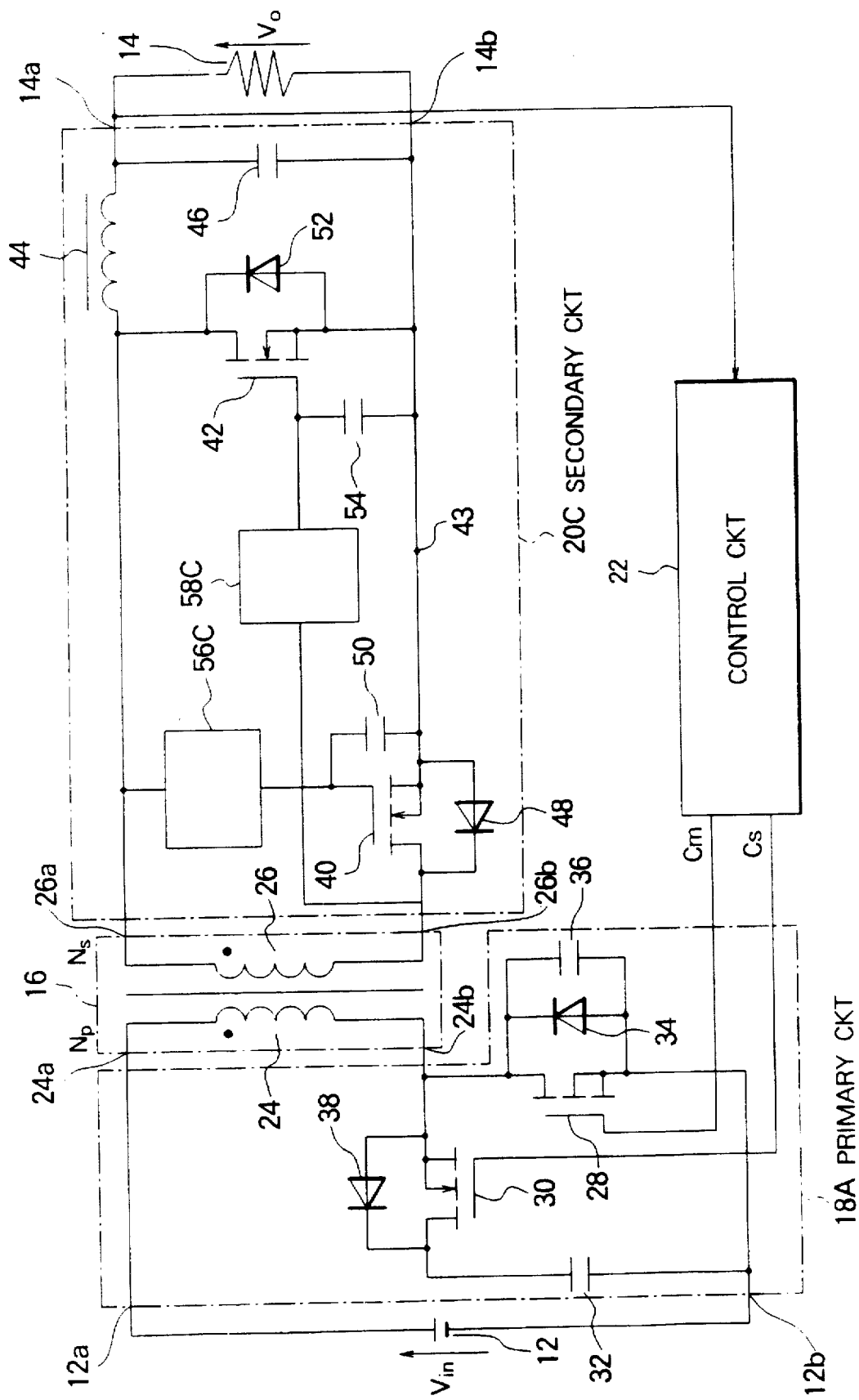
FIG. 9 is a block diagram of a synchronous rectifying circuit of an active clamping type according to a fourth embodiment of this invention.

Referring to FIG. 9, a synchronous rectifying circuit according to a fourth embodiment of this invention comprises similar parts designated by like reference numerals. Like in FIGS. 3, 5, and 7, the illustrated synchronous rectifying circuit comprises the main transformer 16, a primary circuit 18A, a secondary circuit 20C, and the control circuit 22. In the example, the primary circuit 18A is similar in structure to that illustrated in FIGS. 3, 5, and 7 except that the clamping capacitor 32 is connected to the negative input terminal 12b in lieu of the positive input terminal 12a. That is to say, the first series circuit composed of the subsidiary switching device 30 and the clamping capacitor 32 is connected in parallel to the main switching device 28.

The secondary circuit 20C is similar in structure and operation to that illustrated in FIGS. 3, 5, and 7. That is, the secondary circuit 20C comprises first and second impedance circuits 56C and 58C. The first and the second impedance circuits 56C and 58C may be the first and the second impedance circuits 56 and 58 illustrated in FIG. 3, respectively. The first and the second impedance circuits 56C and 58C may be the first and the second impedance circuits 56A and 58A illustrated in FIG. 5, respectively. The first and the second impedance circuits 56C and 58C may be the first and the second impedance circuits 56B and 58B illustrated in FIG. 7, respectively. Advantages due to equipping with in the first and second impedance circuits 56C and 58C are similar to those illustrated in FIGS. 3, 5, and 7.

Operation of the primary circuit 18A is similar to the primary circuit 18 illustrated in FIGS. 3, 5, and 7 except that a resonance current caused by a capacitance of the clamping capacitor 32 and the primary inductance of the primary winding 24 of the main transformer 16 flows through the input power source 12.

While this invention had far been described in conjunction with a few embodiments thereof, it will now be readily be possible for those skill in the art to put this invention into practice in various other manners. The first and the second impedance circuits are restricted to those of the above-mentioned embodiments. For example, each of the first and the second impedance circuits may comprise a capacitor connected to the control terminal of the synchronous rectifying element and a parallel circuit composed of a resistor and a diode that is connected to an end of the secondary winding of the main transformer. In addition, each of the first and the synchronous rectifying element may be three-terminal rectifying element having a control terminal other than the MOSFET.

What is claimed is:

1. A synchronous rectifying circuit of an active clamping type for converting an input d.c. voltage into an output d.c. voltage, said synchronous rectifying circuit having a pair of input terminals supplied with the input d.c. voltage and a pair of output terminals for outputting the output d.c. voltage, said synchronous rectifying circuit comprising a main transformer having a primary winding and a secondary winding, a primary circuit connected to the input terminals and the primary winding of said main transformer, a secondary circuit connected to the secondary winding of said main transformer and the output terminals, and a control circuit connected to a preselected one of the output terminals for controlling the primary circuit to produce main and subsidiary control pulse signals, said primary circuit comprising:
  a main switching device connected in series to the primary winding of said main transformer to form a primary series connection circuit and operable in response to the main switch control pulse signal to be selectively put into an on-state and an off-state, said primary series connection circuit being connected between said input terminals; and
  a first series circuit, connected in parallel to the primary winding of said main transformer, comprising a clamping capacitor and a subsidiary switching device which is operable in response to the subsidiary control pulse signal to be selectively put into an on-state and an off-state, said subsidiary switching devices carrying out reverse operation with said main switching device to clamp a primary reset voltage appearing at the primary winding of said main transformer;

said secondary circuit including a synchronous rectifier connected to parallel to the secondary winding of said main transformer and comprising:
  a second series circuit, connected in parallel to the secondary winding of said main transformer, comprising first and second synchronous rectifying elements which are operable in synchronism with said main switching device, the first and the second synchronous rectifying elements having first and second control terminals, respectively, the first and the second synchronous rectifying elements being joined together at a node;
  a first impedance circuit inserted between an end of the secondary winding of said main transformer and the first control terminal of said first synchronous rectifying element; and
  a second impedance circuit inserted between another end of the secondary winding of said main transformer and the second control terminal of said second synchronous rectifying element.

2. A synchronous rectifying circuit as claimed in claim 1, wherein said first impedance circuit consists of a first parallel circuit comprising a first resistor and a first diode having a first anode electrode connected to the first control terminal of said first synchronous rectifying element, said second impedance circuit consisting of a second parallel circuit comprising a second resistor and a second diode having a second anode electrode connected to the second control terminal of said second synchronous rectifying element.

3. A synchronous rectifying circuit as claimed in claim 1, wherein said first impedance circuit consists of a first capacitor connected between the end of the secondary winding of said main transformer and the first control terminal of said first synchronous rectifier, said second impedance circuit consisting of a second capacitor connected between the other end of the secondary winding of said main transformer and the second control terminal of said second synchronous rectifier.

4. A synchronous rectifying circuit as claimed in claim 3, wherein said synchronous rectifier further comprises a resistor connected between the first control terminal of said first synchronous rectifying element and the node joining said first and said second synchronous rectifying elements and another resistor connected between the second control terminal of said second synchronous rectifying element and the node joining said first and said second synchronous rectifying elements.

5. A synchronous rectifying circuit as claimed in claim 1, wherein said first impedance circuit consists of a first capacitor and a first parallel circuit, connected in series to the first capacitor, comprising a first resistor and a first diode, said second impedance circuit consisting of a second capacitor and a second parallel circuit, connected in series to the second capacitor, comprising a second resistor and a second diode.

6. A synchronous rectifying circuit as claimed in claim 5, wherein the first diode has a first anode electrode connected to the first control terminal of said first synchronous rectifying element, the second diode having a second anode electrode connected to the second control terminal of said second synchronous rectifying element.

7. A synchronous rectifying circuit as claimed in claim 5, wherein said synchronous rectifier further comprises a resistor connected between the first control terminal of said first synchronous rectifying element and the node joining said first and said second synchronous rectifying elements and another resistor connected between the second control terminal of said second synchronous rectifying element and the node joining said first and said second synchronous rectifying elements.

8. A synchronous rectifying circuit as claimed in claim 1, wherein said first and said second synchronous rectifying elements are MOSFETs.

9. A synchronous rectifying circuit as claimed in claim 1, wherein said secondary circuit further comprises a smoothing circuit connected between said synchronous rectifier and the output terminals.

10. A synchronous rectifying circuit as claimed in claim 9, wherein said smoothing circuit comprises a choking coil connected to an end of the secondary winding of said main transformer and the preselected one of the output terminals and an output capacitor connected to said output terminals.

11. A synchronous rectifying circuit of an active clamping type for converting an input d.c. voltage into an output d.c. voltage, said synchronous rectifying circuit having a pair of input terminals supplied with the input d.c. voltage and a pair of output terminals for outputting the output d.c. voltage, said synchronous rectifying circuit comprising a main transformer having a primary winding and a secondary winding, a primary circuit connected to the input terminals and the primary winding of said main transformer, a secondary circuit connected to the secondary winding of said main transformer and the output terminals, and a control circuit connected to a preselected one of the output terminals for controlling the primary circuit to produce main and subsidiary control pulse signals, said primary circuit comprising:
a main switching device connected in series to the primary winding of said main transformer to form a primary series connection circuit and operable in response to the main switch control pulse signal to be selectively put into an on-state and an off-state, said primary series connection circuit being connected between said input terminals; and
a first series circuit, connected in parallel to said main switching device, comprising a clamping capacitor and a subsidiary switching device which is operable in response to the subsidiary control pulse signal to be selectively put into an on-state and an off-state, said subsidiary switching devices carrying out reverse operation with said main switching device to clamp a primary reset voltage appearing at the primary winding of said main transformer;

said secondary circuit including a synchronous rectifier connected to parallel to the secondary winding of said main transformer and comprising:
a second series circuit, connected in parallel to the secondary winding of said main transformer, comprising first and second synchronous rectifying elements which are operable in synchronism with said main switching device, the first and the second synchronous rectifying elements having first and second control terminals, respectively, the first and the second synchronous rectifying elements being joined together at a node;
a first impedance circuit inserted between an end of the secondary winding of said main transformer and the first control terminal of said first synchronous rectifying element; and
a second impedance circuit inserted between another end of the secondary winding of said main transformer and the second control terminal of said second synchronous rectifying element.

12. A synchronous rectifying circuit as claimed in claim 11, wherein said first impedance circuit consists of a first parallel circuit comprising a first resistor and a first diode having a first anode electrode connected to the first control terminal of said first synchronous rectifying element, said second impedance circuit consisting of a second parallel circuit comprising a second resistor and a second diode having a second anode electrode connected to the second control terminal of said second synchronous rectifying element.

13. A synchronous rectifying circuit as claimed in claim 11, wherein said first impedance circuit consists of a first capacitor connected between the end of the secondary winding of said main transformer and the first control terminal of said first synchronous rectifier, said second impedance circuit consisting of a second capacitor connected between the other end of the secondary winding of said main transformer and the second control terminal of said second synchronous rectifier.

14. A synchronous rectifying circuit as claimed in claim 13, wherein said synchronous rectifier further comprises a resistor connected between the first control terminal of said first synchronous rectifying element and the node joining said first and said second synchronous rectifying elements and another resistor connected between the second control terminal of said second synchronous rectifying element and the node joining said first and said second synchronous rectifying elements.

15. A synchronous rectifying circuit as claimed in claim 11, wherein said first impedance circuit consists of a first capacitor and a first parallel circuit, connected in series to the first capacitor, comprising a first resistor and a first diode, said second impedance circuit consisting of a second capacitor and a second parallel circuit, connected in series to the second capacitor, comprising a second resistor and a second diode.

16. A synchronous rectifying circuit as claimed in claim 15, wherein the first diode has a first anode electrode connected to the first control terminal of said first synchronous rectifying element, the second diode having a second anode electrode connected to the second control terminal of said second synchronous rectifying element.

17. A synchronous rectifying circuit as claimed in claim 15, wherein said synchronous rectifier further comprises a resistor connected between the first control terminal of said first synchronous rectifying element and the node joining said first and said second synchronous rectifying elements and another resistor connected between the second control terminal of said second synchronous rectifying element and the node joining said first and said second synchronous rectifying elements.

18. A synchronous rectifying circuit as claimed in claim 11, wherein said first and said second synchronous rectifying elements are MOSFETs.

19. A synchronous rectifying circuit as claimed in claim 11, wherein said secondary circuit further comprises a smoothing circuit connected between said synchronous rectifier and the output terminals.

20. A synchronous rectifying circuit as claimed in claim 19, wherein said smoothing circuit comprises a choking coil connected to an end of the secondary winding of said main transformer and the preselected one of the output terminals and an output capacitor connected to said output terminals.

* * * * *